US012651894B2

(12) United States Patent
Männel

(10) Patent No.: US 12,651,894 B2
(45) Date of Patent: Jun. 9, 2026

(54) CAP FOR FASTENING TO CABLES AND OTHER ELONGATED ELEMENTS

(71) Applicant: Andreas Männel, Stuttgart (DE)

(72) Inventor: Andreas Männel, Stuttgart (DE)

( * ) Notice: Subject to any disclaimer, the term of this patent is extended or adjusted under 35 U.S.C. 154(b) by 0 days.

(21) Appl. No.: 18/268,938

(22) PCT Filed: Dec. 7, 2021

(86) PCT No.: PCT/EP2021/084651

§ 371 (c)(1),
(2) Date: Jun. 21, 2023

(87) PCT Pub. No.: WO2022/135917

PCT Pub. Date: Jun. 30, 2022

(65) Prior Publication Data

US 2024/0063625 A1 Feb. 22, 2024

(30) Foreign Application Priority Data

Dec. 22, 2020 (DE) .......................... 102020134636.0

(51) Int. Cl.
*H02G 15/04* (2006.01)
*H02G 1/08* (2006.01)

(52) U.S. Cl.
CPC ........... *H02G 15/043* (2013.01); *H02G 1/081* (2013.01)

(58) Field of Classification Search
CPC ....... H02G 15/042; H02G 15/046; H01R 4/22
(Continued)

(56) References Cited

U.S. PATENT DOCUMENTS 4,035,903 A * 7/1977 Taggart ................... C23F 13/02
204/196.18
4,227,040 A * 10/1980 Scott ........................ H01R 4/22
174/87
(Continued)

FOREIGN PATENT DOCUMENTS

DE 3624514 C2 4/1988
DE 3712257 A1 10/1988
(Continued)

OTHER PUBLICATIONS

International Search Report and Written Opinion cited in corresponding international application No. PCT/EP2021/084651; Mar. 14, 2022; 12pp.

*Primary Examiner* — Chau N Nguyen
(74) *Attorney, Agent, or Firm* — Lempia Summerfield Katz LLC

(57) ABSTRACT

A cap is provided that is designed to facilitate the guidance of one or simultaneously more elongated elements, such as cables, hoses or conduits, which can be at least partially loaded in shear, through a hose, pipe or duct. The cap has an elongated sleeve-shaped section and a closed and at least externally rounded head section. The sleeve-shaped section and the head section have an inner wall defining a cavity that is open on a side opposite the head section. The cavity has a clamping section in which the cross-section of the inner wall tapers toward the head section. The cross-section of the cavity widens in a step-like manner at the end of the clamping section where this section is at its smallest diameter. This forms a circumferential clamping edge at which the elongated elements jam when they are inserted into the cavity.

16 Claims, 4 Drawing Sheets

(58) Field of Classification Search
USPC ........................................................ 174/74 A
See application file for complete search history.

(56) References Cited

U.S. PATENT DOCUMENTS

| | | | | |
|---|---|---|---|---|
| 4,751,350 | A | 6/1988 | Eaton | |
| 5,714,715 | A * | 2/1998 | Sundhararajan ..... | H02G 15/046 |
| | | | | 174/23 R |
| 6,677,530 | B2 * | 1/2004 | Blaha ....................... | H01R 4/22 |
| | | | | 174/84 R |
| 7,262,363 | B2 | 8/2007 | Fukuda et al. | |
| 2005/0164547 | A1 * | 7/2005 | Sakaguchi ............... | H01R 4/70 |
| | | | | 439/521 |
| 2006/0005990 | A1 | 1/2006 | Fukuda et al. | |
| 2007/0001157 | A1 * | 1/2007 | Quick .................... | H02G 1/081 |
| | | | | 254/134.3 FT |
| 2010/0018741 | A1 * | 1/2010 | Rhea ........................ | H01R 4/22 |
| | | | | 174/87 |
| 2010/0200292 | A1 * | 8/2010 | Luzzi .................. | H02G 15/043 |
| | | | | 174/74 A |
| 2015/0137053 | A1 | 5/2015 | Passoni | |

FOREIGN PATENT DOCUMENTS

| | | | |
|---|---|---|---|
| DE | 8812643 | U1 | 2/1989 |
| DE | 4225568 | A1 | 2/1994 |
| DE | 10040693 | A1 | 3/2002 |
| DE | 102005030863 | A1 | 2/2006 |
| DE | 10106068 | B4 | 5/2010 |
| DE | 102008008267 | B4 | 7/2010 |
| EP | 0392089 | A2 | 10/1990 |
| EP | 0529475 | A2 | 3/1993 |
| EP | 0529475 | B1 | 7/1995 |
| EP | 0828327 | A2 | 3/1998 |

* cited by examiner

Fig. 8
Fig. 9
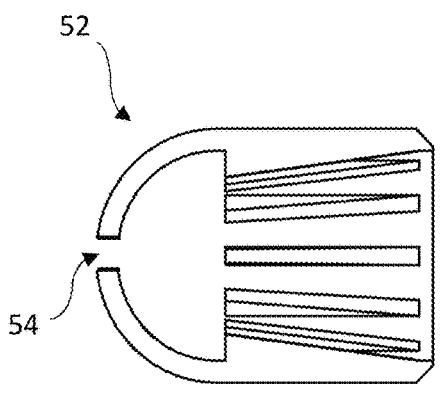
Fig. 10
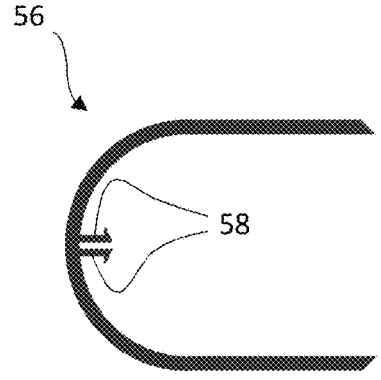
Fig. 11
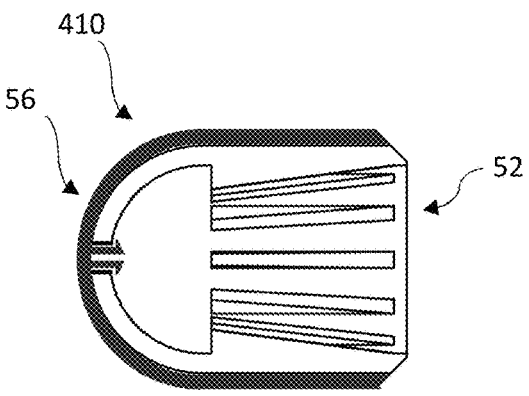
Fig. 12
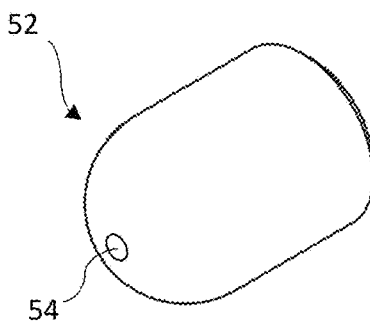
Fig. 13

CAP FOR FASTENING TO CABLES AND OTHER ELONGATED ELEMENTS

BACKGROUND OF THE DISCLOSURE

1. Technical Field

The disclosure relates to a reusable cap that can be applied to the end of one or simultaneously to the ends of several elongated elements such as cables, hoses or conduits, which can be at least partially loaded in shear.

2. Description of the State of the Art

It is well known from application areas such as the construction of residential and commercial properties, the laying of underground cables or automotive and aircraft construction that the use of empty conduits, ducts or hoses when laying cables makes it possible to replace the cables at a later date without having to remove the layers or apparatus above them. Empty conduits are also used when it is not yet known which type of cable or how many cables are to be installed in the future and retrofitting should be possible in principle.

In real estate construction in particular, cables are laid in empty conduits in corrugated pipes or hoses, which have a diameter that changes in a wave-like manner and thus offer the necessary flexibility for laying them in a curve. The cable to be laid is inserted into an empty conduit that usually connects two defined points—junction boxes, sockets or light switches, for example.

With smooth-walled empty conduits running in a straight line, laying cables is relatively easy. If an empty conduit is curved, however, the degree of difficulty increases with the number of bends and the degree of curvature. Particularly in the case of corrugated pipes, considerable difficulties arise when laying cables, as the inserted end of the cable tends to catch on bends and the corrugated inner walls, which prevents it from progressing.

It is known in the art that using a sleeve-like device with a hemispherical closed side significantly simplifies the threading of cables through empty conduits. Such a device minimizes the likelihood of snagging in curves or on the undulating walls of empty conduits and significantly increases the gliding properties of the cable tip.

However, the solutions known so far in this field have a number of disadvantages. Some devices only support one cable diameter at a time; for different diameters, different sizes of the device are required.

Other devices require either the use of tools to prepare the cable for the device or to apply the device to the cable, and/or the use of auxiliary equipment to guide the cable through the empty conduit. In these cases, several work steps are essential before the cable is laid, which takes more time and increases costs.

Previous solutions that do not require tools also have disadvantages. By using a screw, the advantage of protection against electric shocks in situations involving live cables is lost. The sleeve thus cannot be used as a simple protection device against such shocks. Adding a screw within the sleeve also results in a device with a multi-part design, which in turn increases the manufacturing costs and makes the product significantly more expensive than necessary. Moreover, introducing a screw (and the fastening process) negates a portion of the time saved in comparison to using a cap without a screw.

The same also applies to solutions that have a thread along the interior of the sleeve.

Furthermore, few solutions facilitate the routing of several cables at the same time, which makes multiple passes unavoidable in such cases.

SUMMARY OF THE DISCLOSURE

The objective of the present disclosure is to provide, in an example, a reusable cap that is reliable as a means of facilitating the guiding of cables, conductors or other elongated elements through hoses or tubes, as well as inexpensive to manufacture and easy to handle. This objective is achieved by a cap for facilitating the guidance of one or simultaneously several cables, hoses, conduits or other elongated elements through a hose, pipe or duct. The cap has an elongated sleeve-shaped section and a head section, wherein the head section is adjacent the sleeve-shaped section and is rounded at least from the outside. The sleeve-shaped section and head section have an inner wall that has a cross-section, defines a cavity open on a side opposite to the head section, and has a series of grooves that are spaced radially around a circumference of the inner wall, wherein wedge-shaped ribs remain between adjacent grooves. The cavity has a clamping section in which the cross-section of the inner wall tapers toward the head section. The cross-section of the inner wall widens in a step-like manner at an end of the clamping section where a diameter of the clamping section is smallest, thereby forming a circumferential clamping edge at which the elongated elements jam when they are inserted into the cavity.

It has turned out that a tapered clamping section alone is not adequate to achieve a sufficiently firm connection with inserted elongated elements.

In addition to the tapered clamping section, the cap according to the disclosure has a circumferential clamping edge that provides a much tighter connection between the ends of the elongated elements and the cap without the need for additional design measures such as a screw. The free end or ends of the elongated elements are simply pushed through the opening of the sleeve-shaped section and into the cavity, sliding along the tapered inner wall in such a way that self-centering occurs. If the diameter of the elongated element is slightly larger than the smallest diameter of the clamping section, the elongated element will be held in place by the clamping edge as it passes through the smallest diameter of the clamping section. If the clamping edge is sharp enough and the exterior of the elongated element is made of a comparatively soft material, as is typically the case with electrical insulation, the elongated element will be compressed upon being inserted into the tapered clamping section. As soon as the elongated element is pushed over the clamping edge, the cross-section of the elongated element widens again behind the clamping edge. The cap thereby catches in a notch formed in the material of the elongated element. In this process, the cap is not only frictionally connected to the elongated element, but also positively connected to a certain extent. This allows forces to be transmitted in both directions between the cap and the elongated element along the longitudinal axis of the element. As a result, the cap cannot be lost when guiding the elongated element through an empty tube or the like under normal circumstances.

On the other hand, the clamping imparted by the clamping edge is not so tight that the elongated element cannot be pulled out of the cap without the use of tools. It may be necessary to widen the clamping section somewhat using one's fingers.

The material of the cap is not subject to any special requirements. The material should allow for simple, inexpensive manufacturing and smooth, low-friction outer surfaces. In this respect, plastics in particular are suitable.

Ideally, the head section should be completely closed. It can also have small openings such as holes or gaps, however, as long as these do not cause the cap to catch on an edge when sliding along in an empty pipe or the like.

Since the cap may be designed as a single piece and can be manufactured very inexpensively, there will be no appreciable economic loss if it cannot be easily removed. The elongated element or element bundle can then simply be cut to length just behind the cap.

The cap also offers the possibility of clamping to several elongated elements at the same time. Ideally, the total diameter of the elongated elements together should then also be larger than the smallest diameter of the clamping section. The more elastic the material of the cap, the larger the diameter range of the elongated elements onto which the cap can be placed.

In most cases, it is favorable when the outer cross-section of the sleeve-shaped section is round or oval. The cap can then be guided through hoses, pipes or ducts with particular ease.

The cross-section of the cavity should then be round or oval as well. This takes into account the fact that most elongated elements to be guided also have a round or oval cross-section. In principle, the cross-section of the cavity should be adapted to the cross-section of the elongated elements. If the elements have a square cross-section, for example, the cavity in the clamping section should also have a square cross-section to facilitate optimum guidance and clamping.

The inner wall in the clamping section has several grooves that are spaced apart radially around the circumference of the wall. Between the grooves, there are ribs that are wedge-shaped in the longitudinal direction when the grooves are also wedge-shaped. The ribs facilitate the insertion of elongated elements without reducing the clamping forces due to the clamping edge.

The inner wall in the clamping section may have a circumferential groove that forms a further clamping edge. In this way, it is possible to attach the cap to elongated elements with different cross-sections. With two or three such grooves, it is possible to cover a very wide range of element diameters (including when several elongated elements are bundled together). Thinner cables can settle in the rear portion of the clamping section, while thicker cables can settle in the clamping section at an earlier stage. The larger the range of usable cable diameters is to be, the longer and larger the cap's design should be.

In certain applications, a particularly firm attachment of the cap to the elongated element or element bundle is required. In such cases, it can be advantageous to have protruding teeth, spikes or barbs on the inner wall of the clamping section. These then catch in the surface of the elongated element(s) in addition to the clamping edge, thereby increasing the holding forces.

In another embodiment, a part of the inner wall equipped with teeth, spikes or barbs is formed as a spring tongue that is defined by two longitudinal slots in sleeve-shaped section. When the elongated element is inserted into the clamping section, the spring tongue can give way so that the elongated elements can be inserted up to the clamping edge. Then the spring tongue can be pressed from the outside using one's fingers so that the teeth, spikes or barbs catch in the outer surface of the elongated element and hold it in the desired position.

This embodiment can also be helpful when the cap does not have a clamping edge.

In another embodiment, the clamping section can be rotated about a longitudinal axis of the cap relative to an outer surface of the cap.

This embodiment takes into account the fact that rotations about the longitudinal axis of elongated elements frequently occur when the elongated elements equipped with a cap are guided through a hose, tube or channel. A cap firmly connected to the elongated elements performs these rotations as well, but experiences friction on its outer side against the inner wall of the hose, tube or channel, which impedes the passage of the elongated elements. If the outside is rotatable relative to the clamping section (as is the case with this disclosure), the outside can be decoupled from rotations of the clamping section and the elongated element(s) attached thereto. This reduces the friction between the outer side of the cap and the inner wall of the hose, tube or channel, since the outer side does not follow the rotations of the clamping section and the elongated element, or does so only to a limited extent. As a result, no additional friction is caused by rotation of the outer side relative to the inner wall of the hose, tube or channel.

This embodiment is also helpful when the cap does not have a clamping edge. Such a cap has an elongated sleeve-shaped section and a head section adjacent thereto that is rounded (at least from the outside). The sleeve-shaped section and the head section have an inner wall defining a cavity that is open on a side opposite the head section. A fastening element such as a clamping edge or grub screw is positioned in the cavity for fastening the cap to the elongated element. The fastening element can rotate about a longitudinal axis of the cap relative to an outer side of the cap.

In another embodiment, a sleeve-like rotating body forming at least part of the outer surface is attached in a rotatable fashion to the head section, which it encloses (along with at least part of the sleeve-like section). However, it is also possible to form the head section and the sleeve-shaped section in two parts instead of one, and to fasten the head section to the sleeve-shaped section in a rotatable manner. The head section may then have, for example, an apron-like ring section that at least partially encloses the sleeve-shaped section and forms part of the outside of the cap.

The rotating body can be attached to the supporting body by means of a snap-on connection with the aid of a connecting element located inside. The supporting body can, for example, have a hole in its head section through which the connecting element can be inserted.

A chamfer at the rear open end of the cap makes it easier to pull the cable back out of the conduit along with the cap without snagging. Sleeves that extend in a straight line pose the risk of snagging due to the edge created between the end of the sleeve and the cable. The aforementioned chamfer avoids this problem.

When using non-conductive materials such as common types of plastic, the cap can be used as a protection against direct contact with live wires or to protect such wires from harmful weather conditions. On construction sites, luster terminals are very often mounted on cable ends hanging out of walls to protect people from electric shock and to protect the open cable ends from moisture and other effects of weather. In contrast to luster terminals, the outer cable sheath and the wire insulation of individual cable cores do not have to be removed when a cap is used. Several manual operations are also eliminated because the individual cores do not have to be covered. Instead, the cap is placed over the outer sheath of the cable, which covers all the cores therein in one step.

BRIEF DESCRIPTION OF THE DRAWINGS

Embodiments of the disclosure are explained in more detail below based on drawings that include the following:

FIG. 8 a cap according to the disclosure in accordance with a fourth embodiment, which is equipped with opposing spring tongues with radially protruding teeth;

FIG. 9 a top view of the opening of the cap shown in FIG. 8;

FIG. 10 an axial section through an inner part of a two-part cap according to the fifth embodiment;

FIG. 11 an axial section of a rotating body for mounting on the inner part;

FIG. 12 a cap assembled from the parts shown in FIGS. 10 and 11;

FIG. 13 a perspective view of the inner part shown in FIG. 10;

DESCRIPTION OF DISCLOSED EMBODIMENTS

Figure 1:
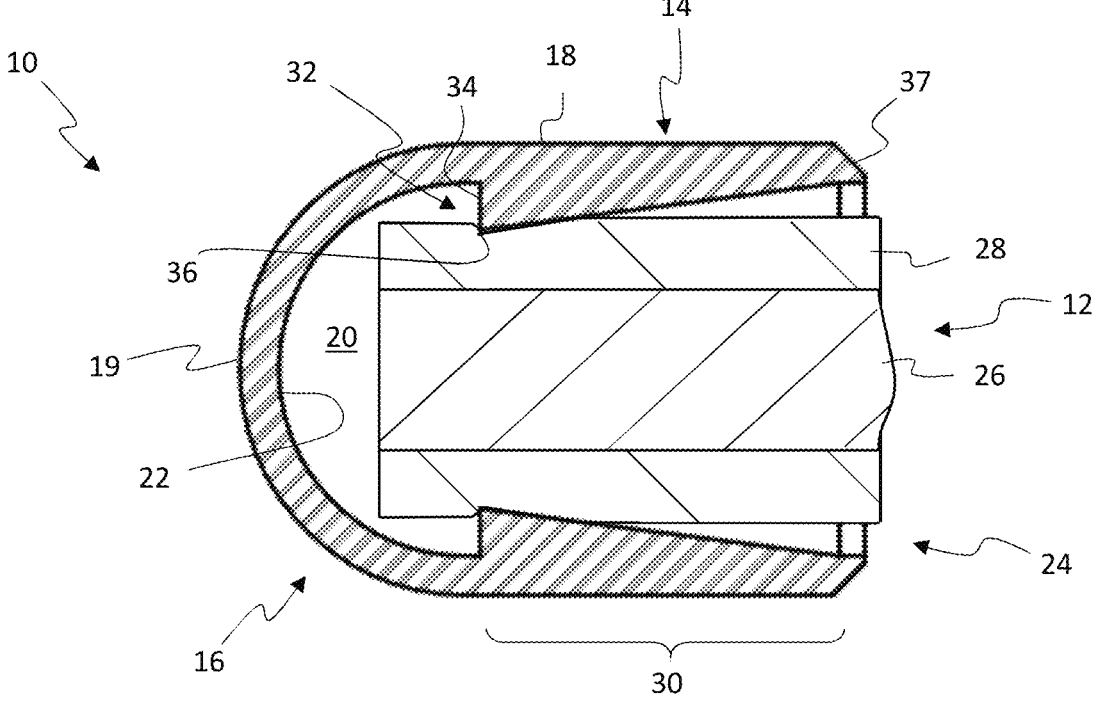
FIG. 1 an axial cross-section through a cap according to the disclosure in accordance with a first embodiment.

FIG. 1 shows a first embodiment and an axial cross-section of a cap according to the disclosure and designated 10 as a whole, as well as an end of a cable 12 inserted therein.

The cap 10 is integrally formed as a molded plastic part and has a sleeve-shaped section 14 and a head section 16 adjoining therein. An outer side 18 of the sleeve-shaped section 14 has a circular cylindrical shape and merges seamlessly into a rounded outer side 19 of the head section 16. Both outer sides 18, 19 are smooth, i.e. they have no protrusions or recesses.

The cap 10 encloses a cavity 20 that is bounded by an inner wall 22. The cable 12 is inserted into the cavity 20 via an opening 24 on the side opposite the head section 16. In the illustrated embodiment, the cable 12 comprises a single core 26 and a cable sheath 28 made of a soft plastic.

In the region of the sleeve-shaped section 14, the inner wall 22 is not cylindrical, but tapers conically towards the head section 16. This part of the inner wall 22 forms a clamping section 30 that extends from the opening 24 to a step 32, at which the diameter of the inner wall 22 increases abruptly. The step 32 is formed in the manner of an undercut by an annular and radially extending shoulder 34. At the step-like transition between the inner wall 22 in the region of the clamping section 30 and the shoulder 34, a circular clamping edge 36 is formed.

At the radially outer end of the shoulder 34, the inner wall 22 transitions into a spherical section, giving the cavity 20 a mushroom-shaped geometry overall.

When the cable 12 is inserted into the cavity 20, the cable sheath 28 is initially compressed by the tapered clamping section 30, which reduces the cross-section of the cable 12. Due to the elastic property of the cable sheath 28, its cross-section expands again behind the clamping edge 36. The clamping edge 36 catches in the notch thus formed in the cable sheath 28 and thereby attaches the cap 10 to the end of the cable 12 in a force-locking and form-fitting manner. The clamping connection can also withstand tensile forces acting in the axial direction, which typically occur when a cable is maneuvered through an empty conduit or the like.

At the end facing the opening 24, the sleeve-shaped section 14 features a chamfer 37 that prevents the cap 10 from catching on obstructions in the empty conduit or the like when the cable 12 is pulled back.

Figure 2:
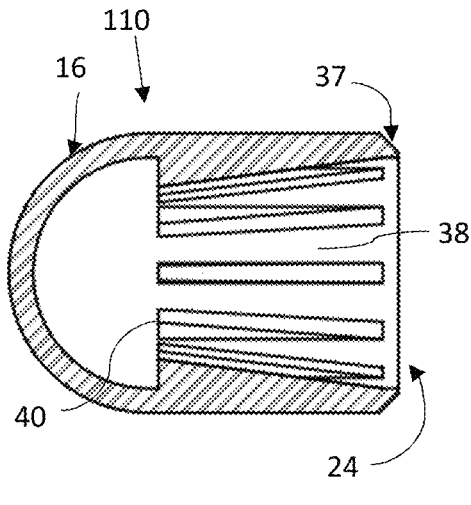
FIG. 2 an axial cross-section through a cap according to the disclosure in accordance with a second embodiment, in which an inner wall in the clamping section is equipped with grooves running in the longitudinal direction.

FIG. 2 shows a cap designated 110 according to a second embodiment in an axial section based on FIG. 1, but without the cable 12. A series of circumferentially equidistant grooves 38 are machined into the conically tapering inner wall 22 in the region of the clamping section 30 in such a way that longitudinally wedge-shaped ribs 40 remain between the grooves 38.

Figure 3:
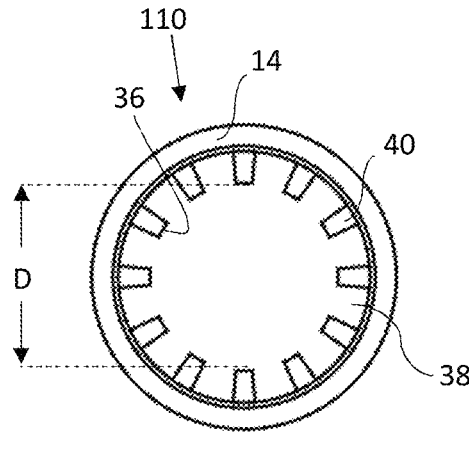
FIG. 3 a top view of the opening of the cap shown in FIG. 2.
Figure 4:
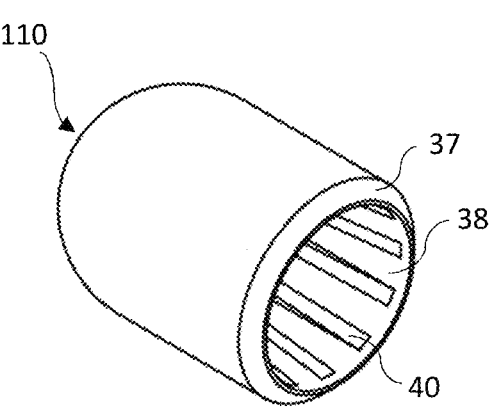
FIG. 4 a perspective view of the cap shown in FIGS. 2 and 3.
Figure 5:
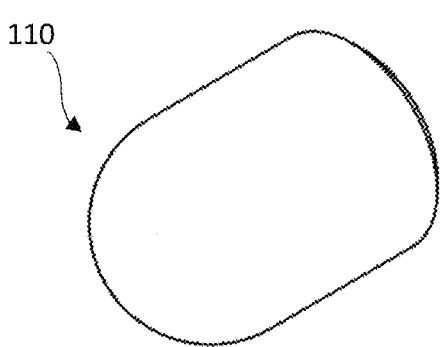
FIG. 5 another perspective of the cap shown in FIGS. 2 to 4.

In FIG. 3, which shows the cap 110 in a top view of the opening 24, the smallest diameter provided for by the ends of the ribs 40 is denoted D. FIGS. 4 and 5 show the cap 110 from different perspectives.

In the cap 110, the clamping edge 36 is not continuous in the circumferential direction, but is interrupted by the grooves 38. The clamping edges 36 formed on the ribs 40 are bounded by corners that facilitate engagement with the sheath 28 of the cable 12. In addition, the ribs 40 make it easier to insert the cable 12 into the cap 110 without reducing the clamping forces.

Figure 6:
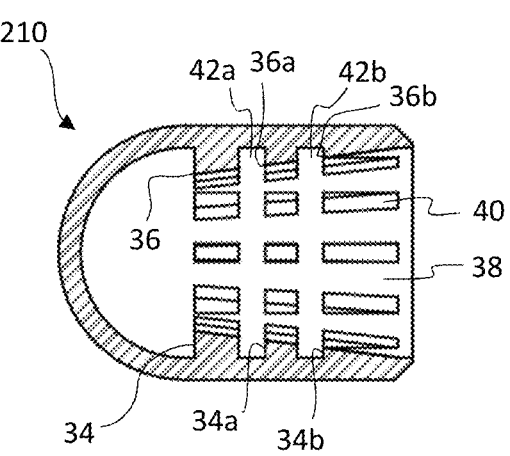
FIG. 6 an axial cross-section of a cap according to the disclosure in a third embodiment, in which circumferential grooves are incorporated into the clamping section.
Figure 7:
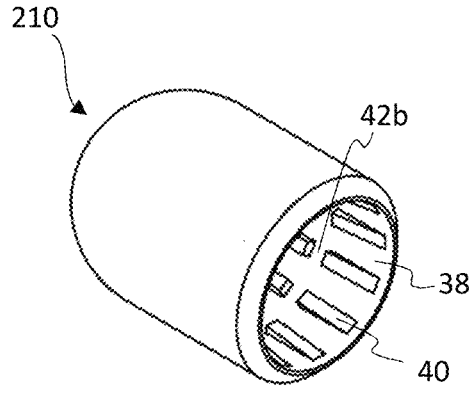
FIG. 7 a perspective view of the cap shown in FIG. 6.

FIGS. 6 and 7 show a cap 210 representing a third embodiment of the disclosure based on FIGS. 2 and 4, respectively. This embodiment differs from the cap 110 shown in FIGS. 2 to 5 in that the inner wall 22 in the region of the clamping section 30 has two additional annular grooves 42a, 42b that are spaced apart axially and run around the circumference of the inner wall. The annular grooves 42a, 42b represent additional steps 34a, 34b at which clamping edges 36a and 36b are formed. However, clamping edges 36a and 36b are on larger inner diameters than the clamping edge 36 formed by the front step 32. This makes it possible to secure the cap 210 to the ends of cables 12 that have a significantly larger diameter than clamping edge 36. Thus, a large diameter cable 12 is secured to clamping edge 36b, medium-diameter cables are secured to clamping edge 36a and small-diameter cables are secured to clamping edge 36.

FIGS. 8 and 9 show a cap designated 310 in its entirety according to a fourth embodiment, but not according to the disclosure, in representations adapted from FIGS. 4 and 3, respectively. The cap 310 has two opposing pairs of longitudinal slots 44 that extend from the opening 24 to the end of the clamping section 30. The portions of the sleeve-shaped section 14 that remain between the adjacent longitudinal slots 44 form spring tongues 46*a*, 46*b* that can give way inwardly or outwardly due to the elastic properties of the plastic used as the material. They then return to the original positions shown in FIGS. 8 and 9.

On each of its two spring tongues 46*a*, 46*b*, the inner wall 22 has a protruding tooth 48, with a conical shape and a tip 50. When a cable 12 is inserted through the opening 24 of the cap 310, the spring tongues 46*a*, 46*b* and the teeth 48 are pressed outward slightly in a radial manner.

The user then squeezes the spring tongues 46*a*, 46*b* slightly, pressing the teeth 48 into the cable sheath 28. This achieves a clamping effect similar to what is provided by the clamping edges of the previously described embodiments.

In the embodiment illustrated in this case, the diameter of the inner wall 22 does not taper in the clamping section 30. However, such tapering can be achieved as in the other embodiment examples so that clamping is provided by both a circumferential clamping edge (possibly interrupted by grooves) and the teeth 48 protruding inwardly from the spring tongues 46*a*, 46*b*.

FIGS. 10 to 13 schematically show the components of a two-part cap 410 in axial sections and a perspective view (FIG. 13). In the embodiment shown, the cap 410 has an inner part 52 shown in FIG. 10 that is constructed in exactly the same way as the cap 110 in FIGS. 2 to 5. The only difference is that the inner part 52 has an axially centered hole 54 in the head section 16.

FIG. 11 shows an envelope-like rotating body 56 which is rotatably attached to the head section 16 of the inner part 52. For this purpose, the rotating body 56 has two tongue-like snap elements 58 that are equipped with barbs at the ends. When the rotating body 56 is placed on the inner part 52, the snap elements 58 are compressed when inserted through the hole 54 and then spring back to their original position, since the diameter of the hole 54 is smaller than the diameter of the barbs. This creates a snap connection between the rotating body 56 and the inner part 52 that allows for rotation between the two parts.

The two snap elements 58 and the hole 54 define an axis of rotation that coincides with the axis of symmetry about which the rotary body 56 can be rotated relative to the inner part 52. The rotating body 56 thereby completely encloses both the head section 16 and the sleeve-shaped section 14 of the inner part 52. When a cable to which the cap 410 is attached is rotated about its longitudinal axis, this rotation is decoupled from the rotating body 56. This reduces friction between the outside of the rotating body 56 and the empty conduit or the like.

FIG. 13 shows the inner part 52 in an illustration based on FIG. 5, in which the hole 54 can be seen.

Figure 14:
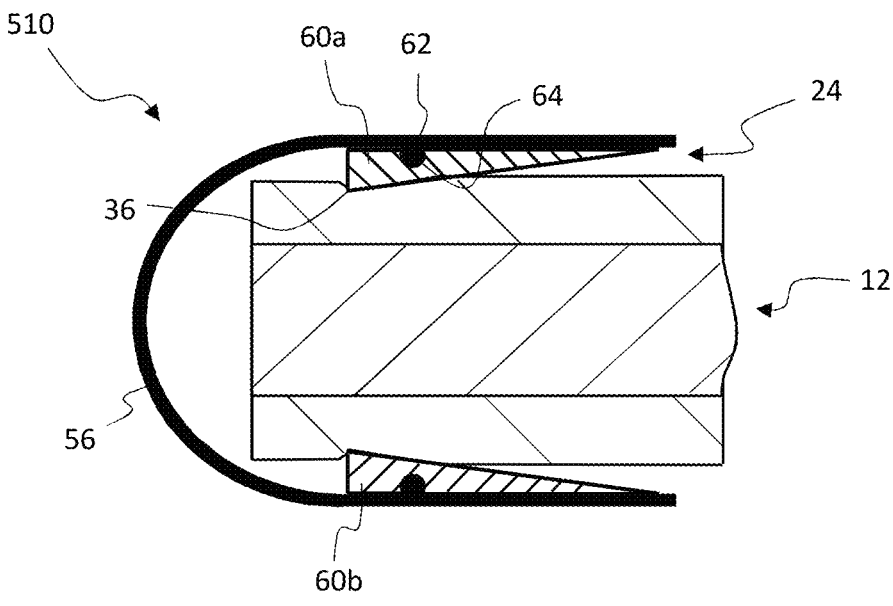
FIG. 14 an axial sectional view of a cap according to the disclosure in accordance with a sixth embodiment, in which the inner part consists of two sleeve half-shells.
Figure 15:
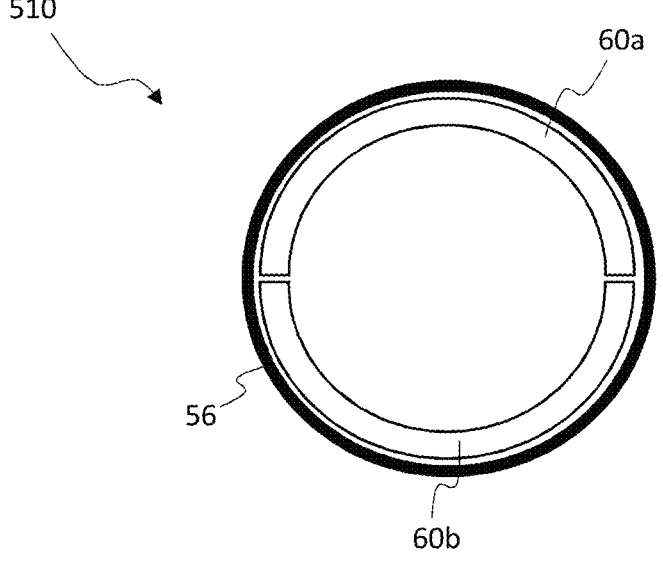
FIG. 15 a top view of the opening of the cap shown in FIG. 14.

FIGS. 14 and 15 show a cap designated 510 according to a sixth embodiment, which is functionally equivalent to cap 410 but of simpler construction. In cap 510, the inner part 52 comprises only the clamping section 30, which itself comprises two sleeve half-shells 60*a*, 60*b*. As the top view of the opening 24 according to FIG. 15 shows, the sleeve half-shells 60*a*, 60*b* butt against each other with play. From the axial cross-section of FIG. 14, it can be seen that the sleeve half-shells 60*a*, 60*b* have a wall thickness that increases continuously starting from the opening 24. The ends of the sleeve half-shells 60*a*, 60*b* that are furthest from the opening 24 form the clamping edge 36.

A circumferential bead 62 on the inside of the rotating body (56) in the cylindrical section engages in a corresponding circumferential recess 64 on the outsides of the sleeve half-shells 60*a*, 60*b*. When the rotating body 56 is pushed onto the sleeve half-shells 60*a*, 60*b*, which are placed one on top of the other, the rotating body 56 expands somewhat so that the bead 62 can snap into the recess 64. Since the diameter of the bead 62 is somewhat smaller than the diameter of the recess 64, the sleeve half-shells 60*a*, 60*b* can rotate freely about the longitudinal axis relative to the rotary body 56.

The two sleeve half-shells 60*a*, 60*b* facilitate mounting on the rotating body 56. In principle, however, it is also possible to mount a single continuous sleeve on the rotating body 56 in this way, as shown in FIG. 14 for a two-piece sleeve.

The invention claimed is:

1. A cap for facilitating the guidance of one or simultaneously a plurality of cables, hoses, conduits, or other elongated elements through a hose, pipe, or duct, wherein:
   the cap has an elongated sleeve-shaped section and a head section, wherein the head section is adjacent to the sleeve-shaped section and is rounded at least from the outside;
   the sleeve-shaped section and head section have an inner wall that has a cross-section and defines a cavity open on a side opposite to the head section;
   the cavity has a clamping section in which the cross-section of the inner wall tapers continuously toward the head section;
   the cross-section of the inner wall widens in a step-like manner at an end of the clamping section adjacent the head section where a diameter of the clamping section is smallest, thereby forming a circumferential clamping edge at which the elongated elements jam when they are inserted into the cavity;
   the inner wall of the clamping section has a series of grooves that are spaced radially around a circumference of the inner wall, wherein wedge-shaped ribs remain between adjacent grooves; and
   the head section is closed so that the one or simultaneously the plurality of cables, hoses, conduits, or other elongated elements cannot protrude through the cap via the head section.

2. The cap of claim 1, wherein an outer cross-section of the sleeve-shaped section is round or oval.

3. The cap of claim 1, wherein a cross-section of the cavity is round, oval, or square.

4. The cap of claim 1, wherein the inner wall has a circumferential groove in the clamping section forming a further clamping edge.

5. The cap of claim 1, wherein a portion of the inner wall in the clamping section has a spring tongue defined by two longitudinal slots in the sleeve-shaped section.

6. The cap of claim 1, wherein the clamping section is configured to be rotatable about a longitudinal axis of the cap relative to an outer surface of the cap.

7. The cap of claim 6, further comprising a sleeve-like rotary body forming at least a portion of the outer surface of the cap, wherein the rotary body is rotatably attached to the head section and encloses the head section and at least a portion of the sleeve-shaped section.

8. The cap of claim 1, wherein an outer circumferential side of the sleeve-shaped section and an outer side of the head section are smooth and free of openings.

9. A cap for facilitating the guidance of one or simultaneously a plurality of cables, hoses, conduits, or other elongated elements through a hose, pipe, or duct, wherein:
   the cap has an elongated sleeve-shaped section and a head section, wherein the head section is adjacent to the sleeve-shaped section and is rounded at least from the outside;

8the sleeve-shaped section and head section have an inner wall that has a cross-section and defines a cavity open on a side opposite to the head section;

the cavity has a clamping section in which the cross-section of the inner wall tapers continuously toward the head section;

the cross-section of the inner wall widens in a step-like manner at an end of the clamping section adjacent the head section where a diameter of the clamping section is smallest, thereby forming a circumferential clamping edge at which the elongated elements jam when they are inserted into the cavity;

the inner wall of the clamping section has a series of grooves that are spaced radially around a circumference of the inner wall, wherein wedge-shaped ribs remain between adjacent grooves; and wherein the head section is configured so that the one or simultaneously the plurality of cables, hoses, conduits, or other elongated elements, which has a diameter exceeding the smallest diameter of the clamping section, cannot protrude through the cap via the head section.

10. The cap of claim 9, wherein an outer cross-section of the sleeve-shaped section is round or oval.

11. The cap of claim 9, wherein a cross-section of the cavity is round, oval, or square.

12. The cap of claim 9, wherein the inner wall has a circumferential groove in the clamping section forming a further clamping edge.

13. The cap of claim 9, wherein a portion of the inner wall in the clamping section has a spring tongue defined by two longitudinal slots in the sleeve-shaped section.

14. The cap of claim 9, wherein the clamping section is configured to be rotatable about a longitudinal axis of the cap relative to an outer surface of the cap.

15. The cap of claim 14, further comprising a sleeve-like rotary body forming at least a portion of the outer surface of the cap, wherein the rotary body is rotatably attached to the head section and encloses the head section and at least a portion of the sleeve-shaped section.

16. The cap of claim 9, wherein an outer circumferential side of the sleeve-shaped section and an outer side of the head section are smooth and free of openings.

\* \* \* \* \*